J. J. DENNISON.
FRICTION CLUTCH.
APPLICATION FILED JULY 1, 1911.

1,011,040.

Patented Dec. 5, 1911.

Witnesses:
G. W. Domarus Jr.
Jas. D. Perry

Inventor
John J. Dennison
B. W. Rummler & Rummler
Attys

UNITED STATES PATENT OFFICE.

JOHN J. DENNISON, OF CHICAGO, ILLINOIS.

FRICTION-CLUTCH.

1,011,040.   Specification of Letters Patent.   Patented Dec. 5, 1911.

Application filed July 1, 1911. Serial No. 636,534.

*To all whom it may concern:*

Be it known that I, JOHN J. DENNISON, a citizen of the United States of America, and a resident of Chicago, county of Cook, State of Illinois, have invented certain new and useful Improvements in Friction-Clutches, of which the following is a specification.

The main objects of this invention are to provide an improved form of friction clutch and bearing construction, which is particularly adapted to insure accurate alinement of running parts, regardless of wear and which is simple and economical in construction and effective in operation.

An illustrative embodiment of this invention is shown in the accompanying drawings, in which—

Figure 2:
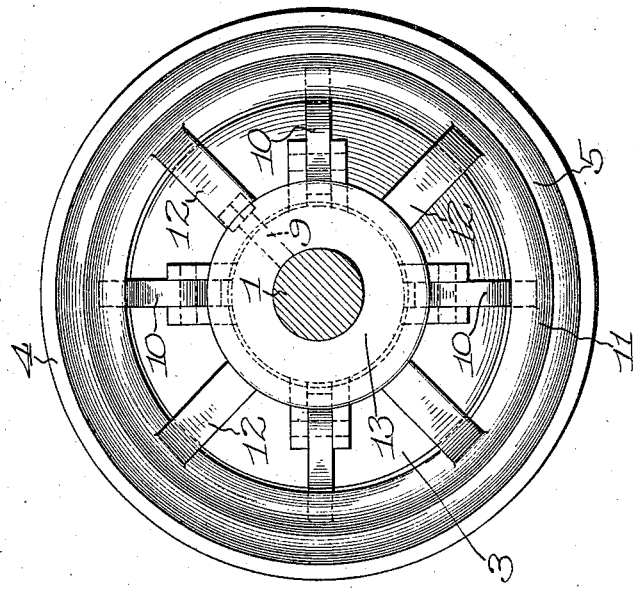
Figure 1:
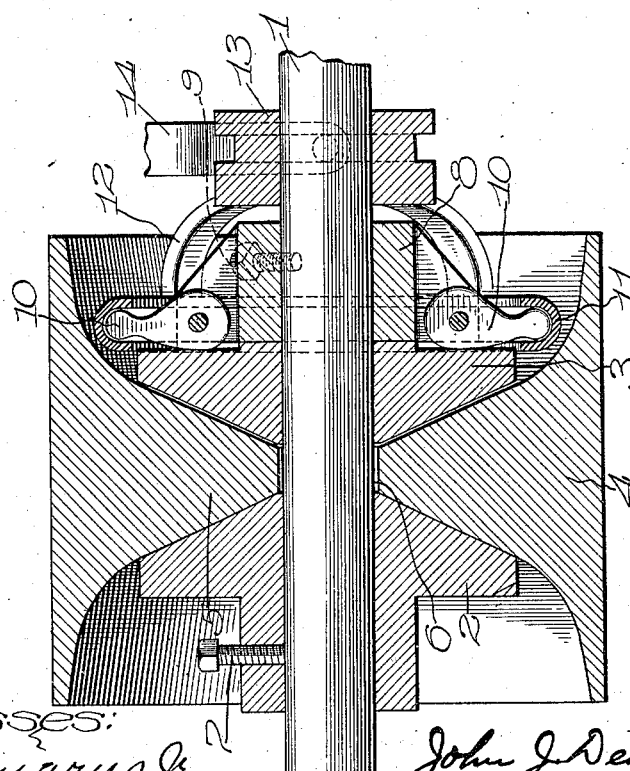

Figure 1 is a sectional elevation of a combined loose pulley and friction clutch mechanism constructed according to this invention. Fig. 2 is an end elevation of the same.

In the construction shown in the drawings, the shaft 1, which is supported in suitable bearings (not shown), has mounted thereon a pair of conical bearing members 2 and 3, arranged with their conical faces opposed. A rotary element which is herein shown as a pulley 4 has its hub portion 5 of V-shaped construction so as to fit between the conical faces of the members 2 and 3. The central bore of the pulley 4 is shown somewhat larger than the shaft 1, so as to provide an oil space which may be filled with oil. The member 2 is adapted to be adjusted to a desired position on the shaft 1 and secured by means of a set screw 7. The member 3, however, is adapted to have axial movement toward and away from the member 2 and limited by the distance between the hub 5 and the sleeve 8, which is secured in the proper position on the shaft by means of the set screw 9.

The shaft 1 and member 4 are adapted to have a relative rotation and the members 2 and 3 serve as a bearing for the pulley 4 during such relative rotation. However, when it is desired to cause the shaft and member 4 to rotatate together, the member 3 is urged inwardly toward the member 2 so as to cause a frictional gripping of the hub 5 between the conical faces of the members 2 and 3. The shifting of the member 3 is accomplished by a plurality of cams 10 pivotally mounted in bifurcated lug portions of the sleeve 8. When the arms of these cams are pulled outwardly, their cam surfaces bear against the member 3 and force it inwardly. The arms of the cams 10 all travel in a runway or ring 11, rigidly supported by arms 12 on the shiftable collar or sleeve 13. The collar 13 is of the usual construction and coacts with the usual forked shifting lever 14 by means of which it is shifted along the shaft.

Although but one specific embodiment of this invention is herein shown and described, it will be understood that numerous details of the construction shown may be altered or omitted without departing from the spirit of this invention, as defined by the following claims.

I claim:—

1. The combination of a shaft, a pair of conical members mounted thereon in spaced relation with their conical faces opposed, one of said members being fixed on said shaft and the other member being movable toward and away from the first, a collar fixed on said shaft outwardly of said movable member and adapted to limit the movement thereof away from said first member, a wheel having its hub portion shaped to fit between said conical faces and adapted to rotate thereon, a plurality of cams pivotally mounted on said collar and having arms extending radially outward, and means slidably mounted on said shaft and adapted to shift said cams into and out of position for holding said movable member into gripping relation to said hub.

2. The combination of a shaft, a pair of conical members mounted thereon in spaced relation with their conical faces opposed, one of said members being fixed on said shaft and the other member being movable toward and away from the first, a collar fixed on said shaft outwardly of said movable member and adapted to limit the movement thereof away from said first member, a wheel having its hub portion shaped to fit between said conical faces and adapted to rotate thereon, a plurality of cams pivotally mounted on said collar and having arms extending radially outward, a sleeve slidably mounted on said shaft, a ring carried by said sleeve and having a runway therein adapted to receive the ends of said arms, and means for actuating said sleeve to operate said cams so as to shift said movable member toward said fixed member for gripping said hub portion to secure the shaft and pulley against relative rotation.

Signed at Chicago this 26th day of June 1911.

JOHN J. DENNISON.

Witnesses:
 EDWIN PHELPS,
 MARY McILVAINE.

Copies of this patent may be obtained for five cents each, by addressing the "Commissioner of Patents, Washington, D. C."